Aug. 29, 1944.     T. R. HARRISON     2,357,193
RADIATION PYROMETER
Filed Sept. 24, 1941     7 Sheets-Sheet 1
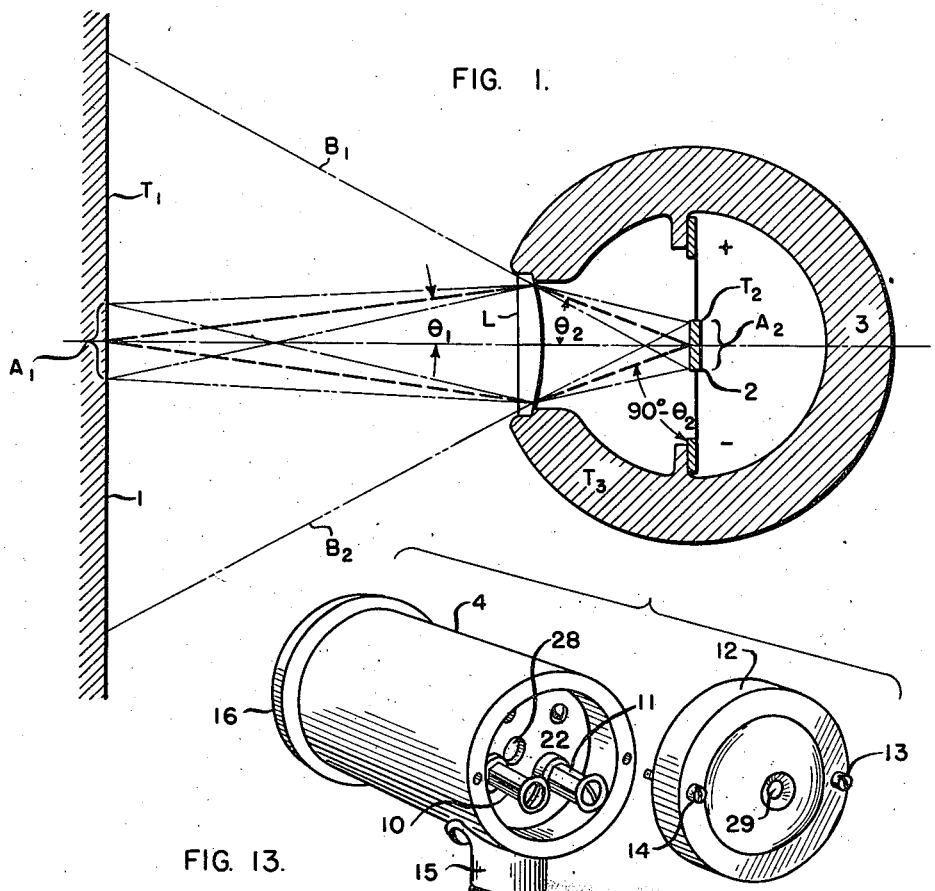
FIG. 1.
FIG. 13.
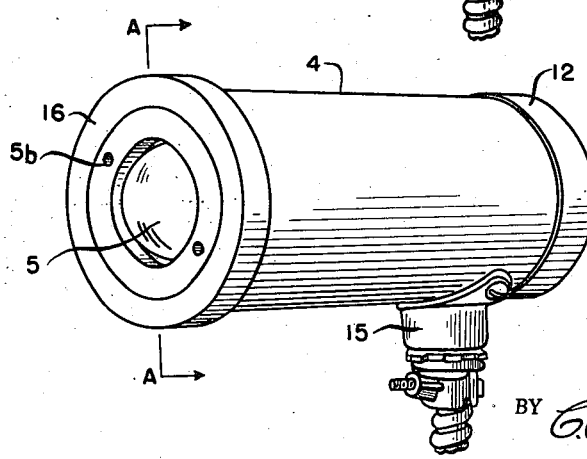
FIG. 14.
INVENTOR.
THOMAS R. HARRISON
BY C. B. Spangenberg
ATTORNEY.

Aug. 29, 1944.  T. R. HARRISON  2,357,193
RADIATION PYROMETER
Filed Sept. 24, 1941    7 Sheets-Sheet 3

INVENTOR.
THOMAS R. HARRISON

UNITED STATES PATENT OFFICE 2,357,193

RADIATION PYROMETER

Thomas R. Harrison, Wyncote, Pa., assignor to The Brown Instrument Company, Philadelphia, Pa., a corporation of Pennsylvania Application September 24, 1941, Serial No. 412,071

43 Claims. (Cl. 136—4)

The present invention relates to radiation measuring apparatus utilizing a thermopile and more particularly, to such apparatus for measuring the temperature of substances. The apparatus of the present invention has especial utility in modern industrial applications involving the measurement of high temperatures including the metallurgical field wherein it is desired to measure the temperatures of furnaces and molten metals, for example.

A general object of the present invention is to provide a new and improved construction for radiation measuring apparatus which insures rapidity of response without subsequent drift or creep in the measurement obtained, and also substantial freedom from transient errors caused by temporarily unbalanced temperature relations within the body of the apparatus during a change in ambient temperature throughout the range of measurement of the apparatus.

Another object of the invention is to provide a radiation pyrometer incorporating these desirable features for measuring the temperature within the interior of a furnace and which also is characterized in that very small change in calibration of the pyrometer occurs with variation in distance factor for distances up to and greater than twenty times the furnace aperture. By distance factor is meant the ratio of the distance from the radiation pyrometer to the furnace to the diameter of the furnace aperture required for correct calibration of the apparatus.

Another object of the present invention is to provide radiation measuring apparatus of the type referred to above which is adapted to withstand high ambient temperatures.

Still another object of the invention is to arrange a thermopile in a housing, composed of a mass of suitable material and so configured as to exhibit good thermal conduction characteristics for insuring uniformity of temperature throughout the mass, in such manner that the said housing surrounds both the hot and cold junctions of the thermopile to the end that the walls surrounding the thermopile are at uniform temperature and further that certain parts of the elements of the thermocouples which comprise the thermopile are in good thermal conductive relation with the housing, and in addition to provide a temperature responsive winding connected with the thermopile and in good thermal conductive relation with the housing to compensate for variations in the ambient temperature to which the housing is subjected.

Another object of the invention is to so relate the dimensions and materials of the thermopile and the conditions of its mounting as to insure substantially exact compensation for variations in the temperature of the housing over desirably wide ranges of temperatures of the housing and of the substances whose temperatures are to be measured.

A further object of the invention is to provide in such radiation measuring apparatus an adjustable diaphragm in good thermal conductive relation with the housing to vary the irradiation of the hot junction of the thermopile as required to effect the necessary calibration adjustments of the apparatus.

Another object of the invention is to provide in such radiation measuring apparatus an outer housing for the first mentioned housing in which the lens is mounted in proper relation with the thermopile, said outer housing having good thermal conduction characteristics and being in good thermal contact with the inner housing to insure equality of temperature between the lens and the thermopile. It is also an object of the invention to utilize the said outer housing to provide a thermally shielded binding post compartment with provision for conduit attachment to its side.

It is an additional object of the invention to provide a removable cover for the binding post compartment in which an eyepiece lens is mounted for facilitating the sighting of the pyrometer upon the substance whose temperature is to be measured.

A further object of the invention is to provide an improved construction for a thermopile which is characterized by its ease of manufacture as well as by its compactness, simplicity, ruggedness and effectiveness.

A more specific object of the invention is to provide a thermopile of "wagon wheel" construction in which the hot junctions form the hub of the "wagon wheel" but are out of physical engagement with each other, however, and are formed by welding the ends of the thermocouple elements, flattening and blackening the resulting junction, and in which the cold junctions of the thermocouple elements are comprised of thin metallic strips having a relatively large area and which may be constantan, for example, and which are welded to the other ends of the thermocouple elements and are spaced radially at regular intervals to an annular disc of mica, being fastened to the mica disc by flattening over extrusions formed in the metallic strips and extending through suitable openings in the mica disc.

Another specific object of the invention is to arrange such a thermopile in a housing composed of a mass of material having high thermal conduction characteristics in such manner that the thin metallic strips and thereby the cold junctions of the thermopile are maintained in close thermal relation with the said mass of material and the hot junctions are disposed in a small chamber formed in the housing and out of direct thermal contact with said mass.

In the prior art considerable complication has been resorted to in an effort to make correction for the gradual rise in temperature of the cold junctions of a thermopile which occurred with certain radiation measuring apparatus designs following the irradiation of the hot junctions of the thermopile, for example, as disclosed in U. S. Patent 1,533,740, issued April 14, 1925, to G. Keinath. Difficulty from this source has been avoided in accordance with the present invention by placing the thermopile within a small chamber encompassed by a mass of material having good thermal conduction properties such, for example, as aluminum, and by providing good thermal contact between the cold junctions of the thermopile and the mass of material. By virtue of this improved arrangement such heat as may be conducted through the wires of the thermocouples comprising the thermopile from the hot junctions to the cold junctions will be transmitted into the mass of material without effecting significant rise in temperature of the latter, and consequently without causing significant rise in temperature of the cold junctions. As a result, when the hot junctions of the thermopile are heated by irradiation from a constant heat source, the electromotive force developed by the thermopile will reach a stable value at substantialy the same time that the temperature of the hot junction has reached a stable value throughout the measuring range of the apparatus, the thermopile not being subject to drift in cold junction temperature as a result of heat conducted thereto from the hot junction. Accordingly, the necessity for providing compensating means as are contemplated in the Keinath patent referred to above has been eliminated.

By the addition of a temperature responsive winding on the mass of material surrounding the thermopile and connected to the thermopile compensation is obtained for variation in the cold junction temperature of the thermopile which may be caused by variations in the ambient temperatures to which said mass of material is subjected.

In accordance with the present invention the thermopile is arranged within a chamber in a mass of material providing good thermal conduction throughout and the thermopile cold junctions are disposed in close thermal association with the mass of material, and in addition a compensating winding is arranged upon the same mass of material in such manner as to be in good thermal relation therewith and with the cold junctions of the thermopile to compensate for changes in calibration of the latter with changes in ambient temperature, that is, in the temperature changes to which the mass of material is subjected to from external sources. In addition, an adjustable calibrating diaphragm and also binding posts are arranged in good thermal relation with the said mass of material. Further novel features of the present invention are involved in the design of the outer structure which supports the lens at one end and serves as a container for the above mentioned mass of material, and the provision of good thermal contact between these component parts of the arrangement, and also are concerned with the provision of a compartment for the binding posts and a suitable place for attaching conduit thereto.

The various features of novelty which characterize my invention are pointed out with particularity in the claims annexed to and forming a part of this specification. For a better understanding of the invention, however, and the objects attained with its use reference should be had to the accompanying drawings and descriptive matter in which I have illustrated a preferred embodiment of the invention.

Of the drawings:

Fig. 1 is a diagram of a radiation pyrometer in which no provisions are made for compensating for ambient temperature changes and which is utilized for making a mathematical analysis of the temperature relations that are involved in the radiation pyrometer of the present invention;

Figs. 13 and 14 are views showing the external appearance of the radiation pyrometer shown in Figs. 6–8.

Figure 2:
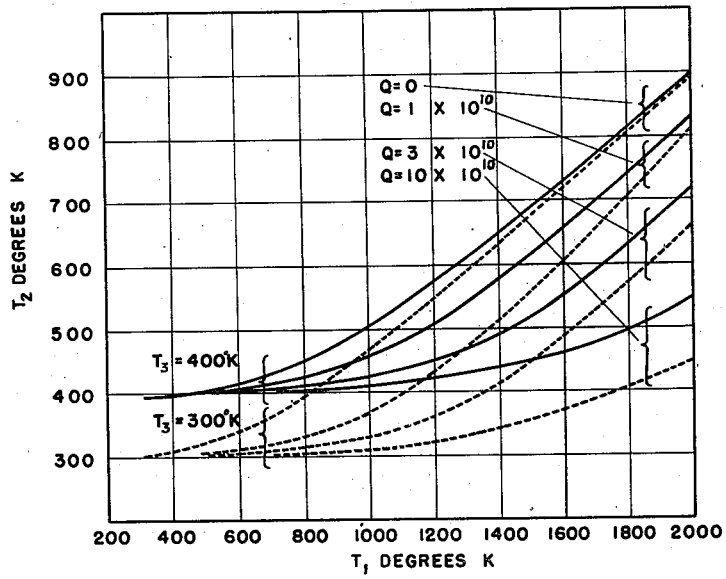
Figs. 2–5 show curves illustrating the effects of variations in ambient temperature changes on the radiation pyrometer of Fig. 1.

The attainment of high sensitivity and freedom from transient errors in radiation measuring apparatus has received a great deal of attention in the prior art as recorded by Coblentz, Cartwright, and others as is set out in detail in an article describing the radiation pyrometer of the present invention and entitled "An improved radiation pyrometer," by Thomas R. Harrison and William H. Wannamaker, in vol. 12, No. 1, pages 20–32, January 1941, issue of the Review of Scientific Instruments, but the requirement for ambient temperature compensation was not given full consideration at the same time by these prior art workers. In order to provide a clear conception of this problem as a whole, and more particularly, to coordinate the requirements for adequate sensitivity with the growing industrial demand for constancy of calibration when the pyrometer is operated at various fixed ambient temperatures and when the temperature of the pyrometer is caused during operation to rapidly change from one value to another, a mathematical analysis of the temperature relations which are involved in the radiation measuring apparatus of the present invention is given hereafter in connection with Figs. 1–5 and 9–12.

In the drawings Fig. 1 illustrates a lens L focussing radiation from an area $A_1$ of a heated surface or furnace 1 at temperature $T_1$ upon a receiver 2 having an area $A_2$ at temperature $T_2$ and which comprises the hot junction of a thermocouple. The cold junctions of the thermocouple are in good thermal contact with the surrounding shell 3 at temperature $T_3$ and are assumed to have the same temperature as that of the shell. Where a thermopile is used the area $A_2$ is considered to represent the part of the total receiver area that is individual to one thermocouple. It is noted the excess temperature $T_2-T_3$ develops the thermoelectric electromotive force.

When radiant energy falls upon a lens, only part is transmitted, the rest being absorbed or reflected. It is assumed that the lens transmits the radiant energy of all wave lengths between 0 and $\lambda$ and that within this range reflection from the lens surfaces reduces the transmitted energy to 0.92 times the instant energy. In this analysis, use is made of values published by Holladay in the Journal of the Optical Society of America and the Review of Scientific Instruments 17, No. 5, pp. 332-3 (1928) in which the proportion of the spectral energy from the blackbody within the region from ultraviolet to the limit $\lambda T$ with respect to the total energy radiated from a blackbody within the same period of time is given. Thus, the lens transmits $0.92\phi$ times the blackbody radiant flux falling upon it. Hereinafter subscripts to $\phi$ indicate the body whose temperature is used in selecting the proper value for $\phi$ from Holladay's table.

According to the Stefan-Boltzmann radiation law and the Lambert cosine law which may be obtained by reference to the text "Measurement of Radiant Energy," edited by W. E. Forsyth (Magraw-Hill), pp. 2, 3, 11 and 12, the radiant flux emanating from a unit area of a blackbody surface at T degrees Kelvin and passing within a conical surface whose elements make an angle $\theta_1$ with a line normal to the emitting surface, as seen in Fig. 1 is $$W_{\theta_1} = 2\pi J \int_0^{\theta_1} \sin\theta_1 \cos\theta_1 \, d\theta_1 = \pi J \sin^2\theta_1 = \sigma T^4 \sin^2\theta_1$$

where W may be expressed in watts per square centimeter of source radiated within the cone referred to, J the radiant intensity normal to the emitting surface and $\sigma$ is the Stefan-Boltzmann radiation constant expressed in equivalent terms.

Accordingly, the radiant flux falling upon and passing through the lens from area $A_1$ is $$0.92\phi_1\sigma T_1^4 A_1 \sin^2\theta_1$$

Since $A_2 \sin^2\theta_2$ may be substituted for $A_1 \sin^2\theta_1$ this expression becomes $$0.92\phi_1\sigma T_1^4 A_2 \sin^2\theta_2 \quad (2)$$

If the front side of the receiver is a blackbody and the lens focusses all of this radiant flux upon the thermopile, Expression (2) represents the radiant flux from the furnace that is absorbed by the receiver.

Likewise, expressions may be written for that radiant flux from the blackbody inner walls of shell 3 and from the lens (also at ambient temperature $T_3$) which is absorbed by the receiver, and for the radiant flux emanating from the receiver, the emissivity of the front surface of which is taken as unity and of the rear as $e$. The receiver loses heat by thermal conduction also. Equating the sum of the rates of energy absorption by the receiver to the sum of the rates of energy dissipation from it, the following equation is obtained:

$$0.92\phi_1\sigma T_1^4 A_2 \sin^2\theta_2 + \sigma T_3^4 A_2[1+e-0.92\phi_3 \sin^2\theta_2] =$$
$$\sigma T_2^4 A_2[1+e] + [T_2-T_3] \times$$
$$\frac{\pi}{4}\left[\frac{d_1^2 c_1[1+\alpha t]}{L_1} + \frac{d_2^2 c_2[1+\beta t]}{L_2} + G_0[1+\gamma t]\right] \quad (3)$$

where the four major terms represent the four rates of heat exchange in the order mentioned.

By manipulation, this equation may be put into the form:

$$\frac{1+e}{\sin^2\theta_2}T_2^4 + QT_2 = 0.92\phi_1 T_1^4 + M \quad (4)$$

where $$M = T_3^4\left[\frac{1+e}{\sin^2\theta_2} - 0.92\phi_3\right] + QT_3 \quad (5)$$

and $$Q = \frac{\pi}{4\sigma A_2 \sin^2\theta_2}\left[\frac{d_1^2 c_1[1+\alpha t]}{L_1} + \frac{d_2^2 c_2[1+\beta t]}{L_2} + G_0[1+\gamma t]\right] \quad (6)$$

The term Q for convenience may be called the conduction factor. Of its components as given in Eq. (6), $d_1$ and $d_2$ represent the diameters of the thermocouple wires and $L_1$ and $L_2$ their lengths, all in centimeters; $c_1$ and $c_2$ are the thermal conductivities of the two thermocouple wires expressed in watts per $cm.^2$ cross-sectional area per cm. length per degree C. temperature difference, and $G_0$ represents the watts per degree temperature difference loss from the receiver by thermal conduction through the surrounding air or gas, the values of $c_1$, $c_2$ and $G_0$ applying for a basic temperature from which temperature change $t$ is measured; $\alpha$, $\beta$, and $\gamma$ represent the temperature coefficients of thermal conductivity of the materials of the two thermocouple wires and of the gas, respectively; $\sigma$, the Stefan-Boltzmann radiation constant, has the commonly accepted value $$5.735 \times 10^{-12} \text{ watt}/(cm.^2 K.^{\circ 4})$$

and $A_2$ is the area of the receiver in $cm.^2$ per thermocouple. So long as temperature is expressed in degrees Kelvin the numerical value of Q is independent of the units used for the terms in Eq. (6). When $A_2$ thus represents its proportionate part of the total area of the receiver, the proper temperature relations are found without considering the number of thermocouples used in the thermopile. No account is taken of the heat radiated and conducted through the surrounding medium from the parts of the surfaces of the thermocouple wires not serving as receiver.

Inspection of Equations (4), (5) and (6) show that the term Q, and no other term, is dependent upon the size, shape and materials of the thermocouples, the area $A_2$ of receiver per thermocouple, and the heat conducted from the receiver through the surrounding area. Consequently this term Q is of considerable importance in the development of a radiant energy measuring instrument. The term Q affects the sensitivity of the thermopile, the ambient temperature errors, and the possible effectiveness of arrangements for compensating for such errors.

It is desirable for $e$, the emissivity of the rear of the receiver 2, to be small and for $\theta_2$, representing the aperture of the lens to be large. In the development of a radiation pyrometer according to the present invention $e$ was assumed to be 0.2 and $\theta_2$ was assumed to be about 12 to 13 degrees. Accordingly, for purposes of analysis, $\sin^2\theta_2$ is assigned a value of 0.048 and $$\frac{\sin^2\theta_2}{1+e}$$

is made 0.04.

When the cut-off wave length is known for the lens, the values of $\phi_1$ and $\phi_3$ are fixed according to the choice of values for $T_1$ and $T_3$.

As indicated hereinbefore Equations (4), (5) and (6) apply for a lens transmitting all wave lengths of radiation between 0 and $\lambda$. If a lens material is used that transmits wave lengths between $\lambda_a$ and $\lambda_b$, the corresponding values for $\phi_a$ and $\phi_b$ are taken from Holladay's table and their difference used where $\phi$ appears in the above mentioned equations. Two special cases will be considered herein in detail. Case I applies when no lens is used, as when the source is large enough to fill the solid angle between the lines $B_1$ and $B_2$ of Fig. 1 or when a perfect mirror that fills this angle is used, and Case II applies for a design in which a fused silica lens is utilized.

*Case I.*—When no lens is used, the terms $0.92 \phi_1$ and $0.92 \phi_3$ in Equations (4) and (5) are replaced by unity. Having angles and emissivities fixed as stated above, the values 0, 1, 3, and 10 times $10^{10}$ may be assigned to Q, and with a value of 300° Kelvin (80° F.) for the shell temperature $T_3$, the values for receiver temperature $T_2$ corresponding to a series of values of furnace temperature $T_1$ between 300° Kelvin and 2000° Kelvin may be calculated. The value assigned for the shell temperature is then changed to 400° Kelvin (260° F.) and other values of $T_2$ are calculated for the same series of values of $T_1$. These values are listed below in columns 1, 2 and 4 of Table I. In column 3 values of $\Delta T_a$, the excess of hot junction temperature (receiver temperature $T_2$) over cold junction temperature (shell temperature $T_3$) when $T_3$ is 300° Kelvin are listed. In column 5 values of $\Delta T_b$, the corresponding excess of hot junction temperature over cold junction temperature when $T_3$ is 400° Kelvin are listed. These values of excess temperature will be proportional to the electromotive force developed by the thermopile if wires are used having a linear electromotive force versus temperature relation. The values in column 6 giving loss in excess temperature $(\Delta T_a - \Delta T_b)$ caused by heating the pyrometer from 300° Kelvin to 400° Kelvin are to be taken up later in connection with one type of ambient temperature compensation to be considered. Division of the values given in column 5 by those given in column 3 shows the fractional change in excess temperature caused by the indicated change in the pyrometer body temperature. These values listed in column 7 are plotted and used in connection with a shunt resistance type of ambient temperature compensation utilized with the radiation pyrometer of the present invention. Columns 8 and 9 which are practically self explanatory are referred to hereinafter.

TABLE I.—*Case I with zero lens absorption*

| 1 | 2 | 3 | 4 | 5 | 6 | 7 | 8 | 9 |
|---|---|---|---|---|---|---|---|---|
| Furnace temp. | With shell temp. $T_3$=300° K. (80° F.) | | With shell temp. $T_3$=400° K. (260° F.) | | Loss in excess temp. caused by heat pyro. body from 300° to 400° K. | Ratio of excess temp. with $T_3$=400° K. to excess temp. with $T_3$ 300° K. | Furnace temp. required to give same excess temp. $\Delta T_b$ when $T_3$=400° K. as is given with furn. at temp. shown in column 1 with $T_3$=300° K. | Error caused by operat. uncompensated pyro. at 400° K. (260° F.) when calibrat. at 300° K. (80° F.) |
| | Receiver temp. | Excess of hot junction temp. $T_2$ over cold junction temp. $T_3$ | Receiver temp. | Excess of hot junction temp. $T_2$ over cold junction temp. $T_3$ | | | | |
| $T_1$° K. | $T_2$° K. | $\Delta T_a$ | $T_2$° K. | $\Delta T_b$ | $\Delta T_a - \Delta T_b$ | $\Delta T_b / \Delta T_a$ | $T_1'$° K. | $T_1' - T_1$ |
| Q=0 | | | | | | | | |
| 300 | 300.00 | 0 | 397.24 | −2.76 | 2.76 | −∞ | 400 | 100 |
| 400 | 306.18 | 6.18 | 400.00 | 0 | 6.18 | 0 | 516 | 116 |
| 500 | 318.39 | 18.39 | 405.69 | 5.69 | 12.70 | .310 | 630 | 130 |
| 600 | 337.40 | 37.40 | 415.34 | 15.34 | 22.06 | .411 | 742 | 142 |
| 700 | 363.07 | 63.07 | 429.98 | 29.98 | 33.09 | .475 | 852 | 152 |
| 1,000 | 467.52 | 167.52 | 504.10 | 104.10 | 63.42 | .621 | 1,178 | 178 |
| 1,500 | 677.17 | 377.17 | 690.31 | 290.31 | 86.86 | .770 | 1,704 | 204 |
| 2,000 | 897.13 | 597.13 | 902.87 | 502.87 | 94.26 | .842 | 2,216 | 216 |
| Q=1×10$^{10}$ | | | | | | | | |
| 300 | 300.00 | 0 | 398.93 | −1.07 | 1.07 | −∞ | 400 | 100 |
| 400 | 301.38 | 1.38 | 400.00 | 0.00 | 1.38 | 0 | 465 | 65 |
| 500 | 304.26 | 4.26 | 402.24 | 2.24 | 2.02 | .526 | 560 | 60 |
| 600 | 309.47 | 9.47 | 406.28 | 6.28 | 3.19 | .664 | 662 | 62 |
| 700 | 317.91 | 17.91 | 412.83 | 12.83 | 5.08 | .716 | 767 | 66 |
| 1,000 | 371.71 | 71.71 | 454.63 | 54.63 | 17.08 | .762 | 1,079 | 79 |
| 1,500 | 567.11 | 267.11 | 613.51 | 213.51 | 54.60 | .798 | 1,609 | 109 |
| 2,000 | 815.23 | 515.23 | 836.63 | 436.63 | 78.60 | .847 | 2,148 | 148 |
| Q=3×10$^{10}$ | | | | | | | | |
| 300 | 300.00 | 0.00 | 399.52 | −0.48 | 0.48 | −∞ | 400.00 | 100.0 |
| 400 | 300.53 | .53 | 400.00 | 0.00 | 0.53 | 0 | 460.78 | 60.8 |
| 500 | 301.66 | 1.66 | 401.01 | 1.01 | 0.65 | .608 | 541.78 | 41.8 |
| 600 | 303.53 | 3.53 | 402.69 | 2.69 | 0.84 | .762 | 626.7 | 26.7 |
| 700 | 307.07 | 7.07 | 405.87 | 5.87 | 1.20 | .830 | 730.2 | 30.7 |
| 1,000 | 329.94 | 29.94 | 426.29 | 26.29 | 3.65 | .878 | 1,032.8 | 32.8 |
| 1,500 | 443.11 | 143.11 | 525.62 | 125.62 | 17.49 | .878 | 1,555.5 | 55.5 |
| 2,000 | 670.94 | 370.94 | 724.38 | 324.38 | 46.56 | .875 | 2,097.2 | 97.2 |
| Q=10×10$^{10}$ | | | | | | | | |
| 300 | 300.00 | 0.00 | 399.84 | −0.16 | 0.16 | −∞ | 400.00 | 100.00 |
| 400 | 300.17 | 0.17 | 400.00 | 0.00 | 0.17 | 0 | 457.22 | 57.22 |
| 500 | 300.53 | 0.53 | 400.35 | 0.35 | 0.18 | .650 | 535.12 | 35.12 |
| 600 | 301.18 | 1.18 | 400.98 | 0.98 | 0.20 | .830 | 623.88 | 23.88 |
| 700 | 302.26 | 2.26 | 402.02 | 2.02 | 0.24 | .894 | 718.16 | 18.16 |
| 1,000 | 309.65 | 9.65 | 409.14 | 9.14 | 0.51 | .947 | 1,013.26 | 13.26 |
| 1,500 | 348.87 | 48.87 | 446.81 | 46.81 | 2.06 | .958 | 1,516.37 | 16.37 |
| 2,000 | 451.55 | 151.55 | 544.21 | 144.21 | 7.34 | .952 | 2,026.17 | 26.17 |

*Case II.*—For a design wherein a fused silica lens is used it is assumed that the limit of spectral transmission, λ, is 4 microns. Accordingly, values for $\phi_1$ and $\phi_3$ are taken from Holladay's table corresponding to λT equals 4 times the chosen values for $T_1$ and $T_3$, respectively. These values of $\phi$ are used in Equations (4) and (5) which are solved for the same sets of conditions as those specified in Case I. These results are listed in Table II along with derived values obtained in the same manner as the values listed in the corresponding columns of Table I.

From the values given in Table I groups of curves may be drawn to assist in the analysis of the problem of ambient temperature compensation. No curves are presented in Case II because they would be enough like the curves plotted from the values in Table I for it to be sufficient to compare the values of Tables I and II to reach the required conclusions concerning Case II.

In Fig. 2 the computed values for the hot junction temperatures $T_2$ shown in columns 2 and 4 of Table I are plotted against furnace temperature $T_1$. The set of curves drawn in dotted lines TABLE II.—*For Case II with fused silica lens*

| 1 | 2 | 3 | 4 | 5 | 6 | 7 |
|---|---|---|---|---|---|---|
| | With shell temp. $T_3=300°$ K. (80° F.) | | With shell temp. $T_3=400°$ K. (260° F.) | | Loss in excess temp. caused by heat pyrometer body from 300° to 400° K. | Ratio of excess temp. with $T_3$ 400° K. to excess temp. with $T_3$ 300° K. |
| Furnace temp. | Receiver temp. | Excess of hot junc. temp. $T_2$ over cold junction temp. $T_3$ | Receiver temp. | Excess of hot junc. temp. $T_2$ over cold junction temp. $T_3$ | | |
| $T_1°$ K. | $T_2°$ K. | $\Delta T_a$ | $T_2°$ K. | $\Delta T_b$ | $\Delta T_a - \Delta T_b$ | $\Delta T_b / \Delta T_a$ |
| \multicolumn{7}{c}{$Q=0$} | | | | | | |
| 400 | 300.152 | 0.152 | 400.000 | 0 | 0.152 | 0 |
| 450 | 300.534 | .534 | 400.160 | .160 | .374 | .300 |
| 500 | 301.406 | 1.406 | 400.530 | .53 | .876 | .377 |
| 550 | 303.110 | 3.110 | 401.260 | 1.260 | 1.850 | .405 |
| 600 | 306.045 | 6.045 | 402.540 | 2.540 | 3.505 | .420 |
| 650 | 310.627 | 10.627 | 404.583 | 4.583 | 6.044 | .431 |
| 700 | 317.958 | 17.058 | 407.700 | 7.700 | 9.358 | .451 |
| 800 | 337.168 | 37.168 | 417.640 | 17.640 | 19.528 | .475 |
| 900 | 365.72 | 65.72 | 433.73 | 33.73 | 31.99 | .513 |
| 1,000 | 401.02 | 101.02 | 456.33 | 56.33 | 44.69 | .557 |
| 1,200 | 483.36 | 183.36 | 518.16 | 118.16 | 65.20 | .644 |
| 1,500 | 617.94 | 317.94 | 635.70 | 235.70 | 82.24 | .742 |
| 2,000 | 841.35 | 541.35 | 853.34 | 453.34 | 88.01 | .838 |
| \multicolumn{7}{c}{$Q=1 \times 10^{10}$} | | | | | | |
| 400 | 300.032 | 0.032 | 400.000 | 0 | 0.032 | 0 |
| 450 | 300.114 | .114 | 400.063 | .063 | .051 | .532 |
| 500 | 300.300 | .300 | 400.208 | .208 | .092 | .691 |
| 550 | 300.670 | .670 | 400.494 | .49 | .176 | .738 |
| 600 | 301.322 | 1.322 | 401.000 | 1.000 | .322 | .756 |
| 650 | 302.365 | 2.365 | 401.814 | 1.814 | .551 | .767 |
| 700 | 303.972 | 3.972 | 403.050 | 3.050 | .922 | .768 |
| 800 | 309.394 | 9.394 | 407.246 | 7.246 | 2.148 | .772 |
| 900 | 318.87 | 18.87 | 414.58 | 14.58 | 4.29 | .772 |
| 1,000 | 333.66 | 33.66 | 426.01 | 26.01 | 7.65 | .773 |
| 1,200 | 382.79 | 82.79 | 464.15 | 64.15 | 18.64 | .775 |
| 1,500 | 503.65 | 203.65 | 560.86 | 160.86 | 42.79 | .790 |
| 2,000 | 757.74 | 457.74 | 783.50 | 383.50 | 74.24 | .838 |
| \multicolumn{7}{c}{$Q=3 \times 10^{10}$} | | | | | | |
| 400 | 300.012 | 0.012 | 400.000 | 0 | 0.012 | 0 |
| 450 | 300.044 | .044 | 400.028 | .028 | .016 | .636 |
| 500 | 300.116 | .116 | 400.093 | .093 | .023 | .801 |
| 550 | 300.258 | .258 | 400.222 | .222 | .036 | .861 |
| 600 | 300.510 | .510 | 400.450 | .450 | .060 | .882 |
| 650 | 300.916 | .916 | 400.818 | .818 | .098 | .893 |
| 700 | 301.548 | 1.548 | 401.381 | 1.381 | .167 | .893 |
| 800 | 303.680 | 3.680 | 403.293 | 3.293 | .387 | .895 |
| 900 | 307.460 | 7.460 | 406.682 | 6.682 | .778 | .896 |
| 1,000 | 313.501 | 13.501 | 412.089 | 12.089 | 1.412 | .895 |
| 1,200 | 334.994 | 34.994 | 431.238 | 31.238 | 3.756 | .893 |
| 1,500 | 400.14 | 100.14 | 488.59 | 88.59 | 11.55 | .884 |
| 2,000 | 611.09 | 311.09 | 671.96 | 271.96 | 39.13 | .875 |
| \multicolumn{7}{c}{$Q=10 \times 10^{10}$} | | | | | | |
| 400 | 300.004 | 0.004 | 400.000 | 0 | 0.004 | 0 |
| 450 | 300.014 | .014 | 400.009 | .009 | .005 | .643 |
| 500 | 300.037 | .037 | 400.032 | .032 | .005 | .865 |
| 550 | 300.083 | .083 | 400.076 | .076 | .007 | .916 |
| 600 | 300.164 | .164 | 400.154 | .154 | .010 | .939 |
| 650 | 300.295 | .295 | 400.280 | .280 | .015 | .949 |
| 700 | 300.493 | .493 | 400.470 | .470 | .023 | .955 |
| 800 | 301.173 | 1.173 | 401.128 | 1.128 | .045 | .962 |
| 900 | 302.382 | 2.382 | 402.294 | 2.294 | .088 | .964 |
| 1,000 | 304.321 | 4.321 | 404.165 | 4.165 | .156 | .964 |
| 1,200 | 311.292 | 11.292 | 410.892 | 10.892 | .400 | .964 |
| 1,500 | 333.341 | 33.341 | 432.107 | 32.107 | 1.234 | .962 |
| 2,000 | 420.382 | 120.382 | 514.977 | 114.977 | 5.405 | .958 | apply when the pyrometer temperature $T_3$ is 300° K. (80° F.) and the solid lines apply when $T_3$ is 400° K. (260° F.).

Referring to the set of dotted curves alone or to the set of solid curves alone in Fig. 2 it will be noted that reduction in the value of conduction factor Q leads to three characteristics:

a. Greater rise in $T_2$ for a given value of $T_1$.
b. This gain in temperature rise is greatest at the relatively low values of $T_1$.
c. The curves tend to approach nearer to straight lines than when Q is an appreciable value.

Comparison of the family of dotted curves with the family of solid curves shows that when Q is small, a change of 100° C. in $T_3$ produces relatively less change in $T_2$ than when Q is large. That is, when the conduction factor Q is very low, the temperature of the hot junction of the thermocouple is dependent almost entirely upon the furnace temperature and relatively little upon the temperature of the pyrometer body. This is true to a greater degree with high furnace temperatures than with furnace temperatures not greatly different from that of the pyrometer body. It follows that with a low conduction factor Q, the temperature excess, namely, the difference $T_2-T_3$ between hot and cold junction temperatures, falls off to a marked extent with increase in $T_3$, leading to relatively large errors unless adequate compensation is possible and is provided.

Figure 3:
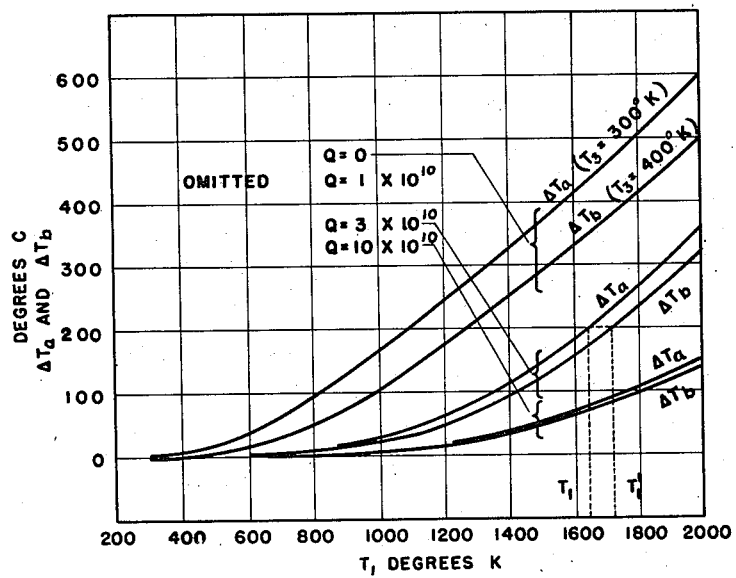

In Fig. 3 the various computed values of temperature excess $\Delta T_a$ and $\Delta T_b$ are plotted against the corresponding values of furnace temperature $T_1$ as given in columns 3 and 5 of Table I. For the sake of clearness, no curves are shown for the case where $Q=1\times 10^{10}$. If we assume a linear E. M. F. versus temperature relation for the thermocouples, the horizontal distances between one of the curves for $\Delta T_a$ and the corresponding curve for $\Delta T_b$ represent the ambient temperature errors caused by operating the pyrometer at an ambient temperature of 400° Kelvin and applying a calibration made with the pyrometer at 300° Kelvin. For example, in Fig. 3 the dotted lines show that with $Q=3\times 10^{10}$, a reading corresponding to a temperature excess $\Delta T=200°$ C. would correspond to a furnace temperature of $T_1=1720°$ K. in one case and to a temperature of $T_1=1650°$ K. in the other. The error would be 70 degrees C. Here $T_1'$ represents the furnace temperature that would produce the same excess $\Delta T$ in hot junction temperature $T_2$ above a shell temperature of $T_3=400°$ K. that would be produced above a shell temperature of 300° Kelvin by a furnace temperature $T_1$. In like manner, other values of $T_1'$ are determined and listed in column 8 of Table I. The values for $T_1'-T_1$ listed in column 9 represent the error in each instance that would be caused by calibrating the pyrometer at an ambient temperature of 300° Kelvin and using that calibration when operating the pyrometer at an ambient temperature of 400° Kelvin. It is deemed needless to provide values corresponding to these for Table II.

Figure 4:
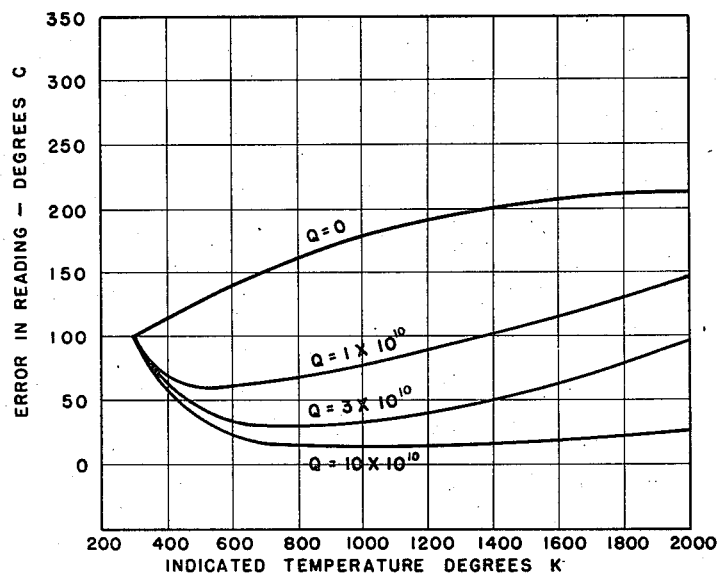

The curves in Fig. 4 illustrate the above-mentioned ambient temperature errors computed for uncompensated pyrometers having different conduction factors Q. Attention is directed to the fact that with large values of conduction factor Q, the ambient temperature errors are relatively small, while with small values of Q, the errors sometimes reach values much larger than the corresponding change in ambient temperature.

All of the curves of Fig. 4 converge at a point indicating an error of 100° C. at an indicated temperature of 300° Kelvin. This is because the pyrometer will deliver zero E. M. F. when sighted upon a furnace whose temperature is the same as that of the pyrometer body, whatever that temperature may be.

It will become apparent to those skilled in the art that if provision could be made for Q to decrease as $T_2$ and $T_3$ increase, $T_2$ could be made to rise to higher values with $T_3=400°$ Kelvin than those values represented for this condition by the curves in solid lines of Fig. 2. Such provision would serve toward compensation for ambient temperature errors.

Several methods have been proposed in the prior art for compensating radiation pyrometers for such changes in calibration with changes in ambient temperature; i. e., in the temperature of the pyrometer body. These include:

(1) Use of a movable shutter carried on a bimetal strip within the pyrometer body and arranged to cut off part of the cone of heat rays reaching the thermopile receiver, the amount cut off diminishing as the pyrometer body becomes hotter. Such operation would have the effect of increasing $\theta_2$ in Eqs. (4), (5) and (6), when $T_3$ increases.

(2) Use of thermocouples made of materials such that, as the temperature excess of hot junctions over cold junctions decreases with increase in $T_3$ and $T_2$, the thermoelectric power will increase in inverse proportion, thus delivering a constant E. M. F. for a given furnace temperature.

(3) Use of thermoelectric connecting wires, or "extension leads" from the pyrometer body to a point having constant temperature (or to a point at which is located other suitable compensating means such as is used in thermoelectric pyrometry).

(4) Use of a shunt across the terminals of the thermopile, the shunt consisting of wires of iron, nickel, or other metal having high temperature coefficient of resistance. A variation of this is the use of a resistance having negative coefficient in series with the thermopile, with a fixed shunt.

Method (1) has the disadvantage of the manufacturing inconvenience of having moving parts within the pyrometer and of making proper adjustment to these parts for correct compensation. Method (2) is undesirable on account of the present lack of suitable materials—those giving a usable thermoelectric power at low thermocouple temperatures with the proper rate of increase with increase in temperature. This leaves methods (3) and (4) to be considered.

In method (3), if extension leads are used to connect the pyrometer terminals to a point at a fixed temperature of 300° Kelvin, for example, these leads will contribute no E. M. F. to the circuit when the pyrometer body also is at 300° Kelvin. If the pyrometer body is then heated up to 400° Kelvin, the extension leads will contribute a given E. M. F., depending upon the nature of the leads and not upon furnace temperature. This E. M. F. will be added to that developed by the thermopile. By choosing suitable extension lead wire materials, this added E. M. F. can be made equal to the loss by the thermopile corresponding to any one selected furnace temperature, say $T_1$ 1000° Kelvin. At this temperature, the extension leads should make up for the loss in excess temperature, $\Delta T_a-\Delta T_b$, as shown in columns 6 of Tables I and II. Since the values of loss in excess temperature differ for different furnace temperatures, this type of compensation can not hold closely over an extended range of furnace temperatures. Accordingly, this method of compensation is also undesirable.

In compensation method (4), a coil of nickel wire is mounted within the pyrometer body and connected as a shunt across the thermopile terminals. It should be so mounted as to insure its being always at the temperature of the cold junctions of the thermocouples whether the pyrometer temperature is steady or changing. The potential drop across the coil will be a variable fraction of the E. M. F. of the thermopile, the fraction increasing as the coil heats. This increase compensates for the loss in thermopile E. M. F. that accompanies the heating of the pyrometer body. With thermocouple wires of substantially zero temperature coefficient of resistance, the fractions mentioned will be independent of the temperature $T_2$ of the hot junctions, and hence independent of furnace temperature $T_1$. Assuming a linear electromotive force versus temperature relation for the thermocouple wires, such a shunt can provide proper ambient temperature compensation when $$\frac{\Delta T_b}{\Delta T_a}$$

is constant for all the values of furnace temperature $T_1$ to be measured.

Figure 5:
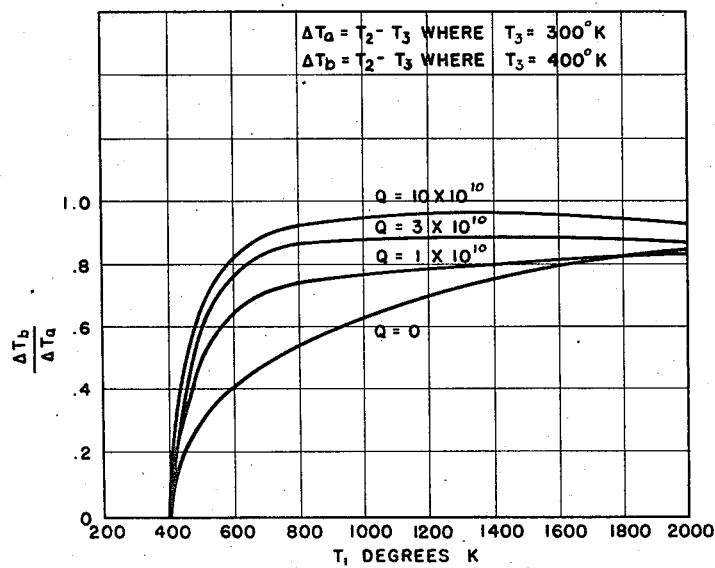

Reference to Fig. 5, plotted from the computed values given in column 7 of Table I will show that this requirement is most nearly fulfilled in the case where $Q=3\times10^{10}$, for which the value of $$\frac{\Delta T_b}{\Delta T_a}$$

is between 0.878 and 0.875 for all values of $T_1$ from 1000° to 2000° Kelvin. Thus, if a pyrometer is designed with a conduction factor Q of about this value, it lends itself to compensation by the nickel shunt method, and such compensation will be accurate for a wide range of industrial conditions.

For Case II, applying for a fused silica lens, the computed values given in column 7 of Table II indicate that the choice of a value for Q lying between somewhat below $3\times10^{10}$ and somewhat above $10\times10^{10}$ should most closely fulfill the requirement for constancy of the ratio $$\frac{\Delta T_b}{\Delta T_a}$$

throughout the opering range of the apparatus.

The assumption that Q does not change with varying ambient temperature, which has been applied in computing the foregoing tables, is usually not strictly accurate. In Eq. (6), temperature coefficients $\alpha$, $\beta$ and $\gamma$ usually are positive wherefore an increase in ambient temperature produces an increase in the value of Q. This leads to greater loss in sensitivity with a given increase in ambient temperature than that indicated in column 7 of Tables I and II. As a consequence, proportionately greater shunt compensation is required. That these conditions are borne out in practice is shown in Table III which is discussed later.

The guide posts apparent from this mathematical analysis are that thermopiles designed for the maximum sensitivity (that is, those having very small conduction factors Q) are subject to the greatest ambient temperature errors, and these errors are the least susceptible to compensation; a thermopile having a large conduction factor Q has smaller errors which for temperature ranges involved in metallurgical and other industrial applications, may be compensated satisfactorily by means of a nickel shunt across the thermopile terminals.

The foregoing considerations indicate the reasons for selecting a design of a pyrometer utilizing a thermopile with a fairly high conduction factor and provided with a nickel resistance shunt in order to obtain the best ambient temperature compensation.

Figure 6:
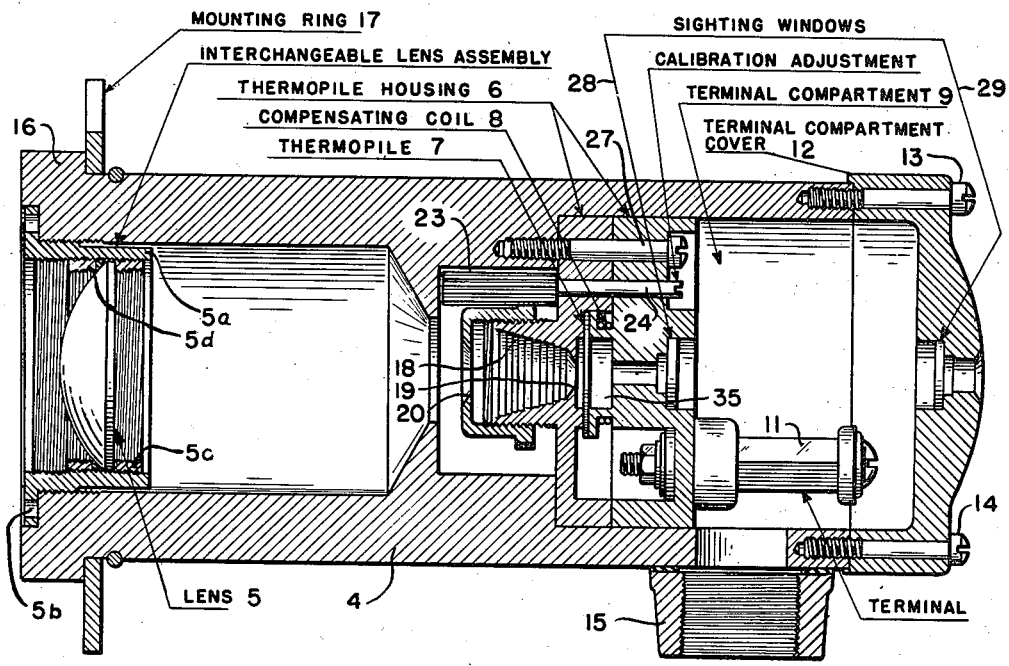
Fig. 6 is a cross-sectional view along the lines A—A of the radiation pyrometer shown in Fig. 14 and is a preferred form of radiation pyrometer embodying the advantageous features of the present invention.

Fig. 6 illustrates a cross-sectional view of a preferred form of radiation pyrometer embodying the novel features of the present invention and designed in accordance with the foregoing mathematical analysis to fulfill the requirements of rapidity of response without subsequent drift or creep, substantial freedom from transient errors, freedom from changes in calibration as a result of ambient temperature variations, and freedom from changes in calibration with variations in distance factor for distances up to slightly greater than twenty times the furnace aperture demanded of modern industrial applications of radiation measuring apparatus of this nature. The radiation pyrometer illustrated in Fig. 6 is intended for measuring temperatures from the lower limit of visible radiation up to the highest encountered in industrial processes.

As illustrated in Fig. 6 the preferred form of radiation pyrometer according to my invention comprises an external housing 4 in the left end of which as seen in the drawings a lens 5 is positioned, in the center of which a sub-housing 6 containing a thermopile 7 and an ambient temperature compensator 8 is located, and at the right end of which a terminal compartment 9 is provided. As shown, binding posts 10 and 11 are contained within the terminal compartment 9 and a terminal compartment cover 12 is provided for said compartment. The compartment cover 12 is attached to the external housing by screws 13 and 14 and therefore the compartment cover 12 may be detached from the external housing 4 by removing the screws 13 and 14 to thereby permit easy access to the binding posts 10 and 11. An internally threaded conduit fitting 15 which provides an opening into the terminal compartment 9 is also provided at the right end of the housing 4 as illustrated. In addition, a mounting flange 16 is provided at the left or front end of the housing 4 to adapt the pyrometer for use with any one of a group of accessories suited to various industrial applications. A mounting ring 17 disposed in cooperative relation with the flange 16 may also be utilized in conjunction with such mounting accessories.

Provisions are made for axially adjusting the position of the lens 5, that is, for adjusting the lens 5 towards or away from the thermopile 7, as required to obtain the optimum conditions of operation. Specifically, the lens 5 is supported by a cylindrical member 5a which is threaded both internally and externally and screws into the internally threaded front or left end of the housing 4. The member 5a is provided with a flange which fits into a recess in the front end of the housing 4 and in which holes 5b are provided to facilitate screwing the member 5a into and out of the housing 4. The diameter of the lens 5 is the same as the internal diameter of the member 5a and is rigidly held in position within the latter by means of threaded rings 5c and 5d which are provided on opposite sides of the lens 5 and screw into the member 5a. Suitable notches or holes, not shown, may be provided for screwing the rings 5c and 5d in and out. The rings 5c and 5d are also threaded internally to prevent reflections therefrom to the thermopile.

To obtain a distance factor of 20:1 with the radiation pyrometer illustrated in Fig. 6, the pyrometer is so designed that the angle of view is approximately 2.90°. The lens 5 concentrates radiant energy upon the hot junctions of the thermopile 7 through a field limiting aperture 19 in the sub-housing 6 immediately in front of the thermopile 7 and through an adjustable calibrating diaphragm 20. As illustrated, the calibration diaphragm 20 is comprised of a circular opening or aperture formed in an internally threaded cap which fits over a threaded projection provided on the sub-housing 6, the threads on the cap engaging the threads on the said projection. The sensitivity of the pyrometer may be adjusted by manipulation of the calibration diaphragm 20 by means of a pinion 23 whose slotted stem 24 may be reached through the terminal compartment 9 of the pyrometer by means of a screw driver. As shown, the cap in which the diaphragm 20 is formed is provided with a gear section which is disposed in cooperative relation with the pinion 23 so that as the pinion 23 is rotated the cap is also rotated, and consequently the distance between the aperture in the cap and the thermopile 7 is varied accordingly.

Reflections are prevented from reaching the sensitive elements of the thermopile 7 by the configuration of the stepped form of the inner surface 18 of the front end of the sub-housing 6 and by the presence of the aperture 20. Specifically, the presence of the diaphragm 20 prevents any reflections from the inner wall of the housing 4 from entering the aperture 19, and the ratio of the radial increments in the steps 18 is made larger with respect to the axial increments than the ratio between the greatest eccentricity of any point on the lens 4 from any point on the stepped surface with respect to the axial distance between said points. This insures the condition that any reflection of heat rays from one of the cylindrical stepped walls will be intercepted by the adjacent radial surface.

It is noted that internal reflections of the latter nature can be intercepted by replacement of the plurality of steps 18 by one single large step near the aperture 19. The entire section occupied by the steps 18, however, will then have the internal diameter of the large cylindrical stepped surface. Such an arrangement is objectionable because the section upon which calibrating diaphragm 20 is mounted would then be thin walled and in consequence the heat conducting capacity of the parts for equalizing the temperature between the calibrating diaphragm 20 and sub-housing 6 would be reduced. Such reduction in the temperature equalizing ability of the parts would increase the possibility of inequality in the temperature between the metal of the calibrating diaphragm 20 on the one hand and the wall of the chamber 35 within which the thermopile 7 is mounted and the compensating coil 8 on the other hand. Thus, in the preferred embodiment of my invention, I prefer to provide a large number of small steps 18 to increase the cross-sectional area of the threaded extension upon which the calibrating diaphragm is mounted and hence to minimize the possibility of temperature inequality between the calibrating diaphragm 20 and the thermopile housing 6.

Figure 7:
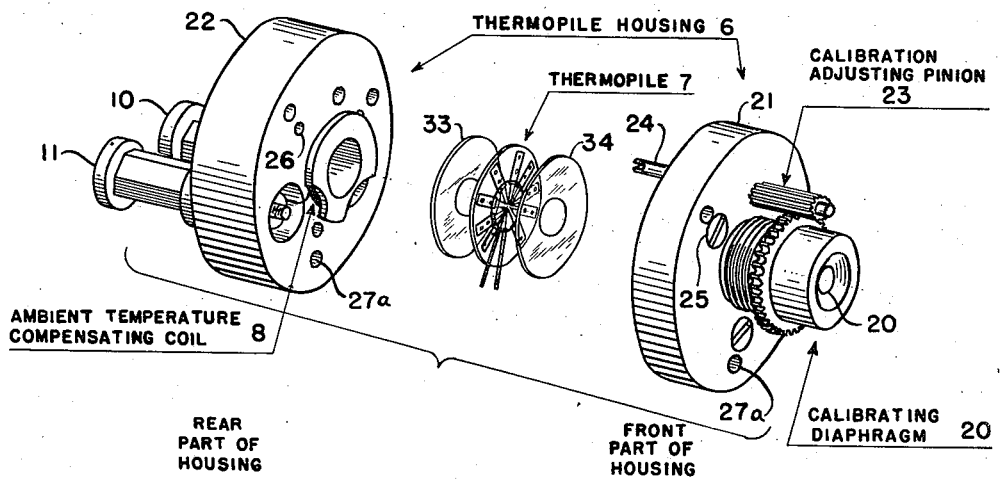
Fig. 7 is an exploded view of a thermopile housing included in the radiation pyrometer shown in Fig. 6.

The thermopile housing 6, as seen in Fig. 7, is comprised of two separate sections 21 and 22. In Fig. 7 the sections 21 and 22 are separated in order to show the thermopile 7 and the compensating coil 8, and in addition the thermopile 7 and the insulating washers therefor are also shown separated to facilitate understanding of its construction. The ambient temperature compensating coil 8 is so located as to insure thermal equality with the thermopile housing 6 at all times. The compensating coil 8 is comprised of resistance wire having a substantial coefficient of resistance such, for example, as nickel resistance wire and is connected in shunt with the thermopile 7.

The sections 21 and 22 of the thermopile housing 6 are normally held in close engagement with each other by means of three screws 25 which extend through the section 21 and fit into threaded holes 26 in the section 22. The thermopile housing 6 is rigidly secured to the external housing 4 by means of three screws 27 as seen in Fig. 6, which extend through holes 27a in both of the sections 21 and 22 and fit into threaded holes provided in the external housing 4.

Sealed windows 28 and 29 are provided in the thermopile housing 6 and in the back cover plate 12, respectively, for facilitating sighting of the pyrometer upon any desired object the temperature of which it is desired to ascertain. Either or both of the windows 28 and 29 may be in the form of lenses which if desired may be magnifying lenses to further facilitate sighting of the pyrometer upon the said object.

Figure 8:
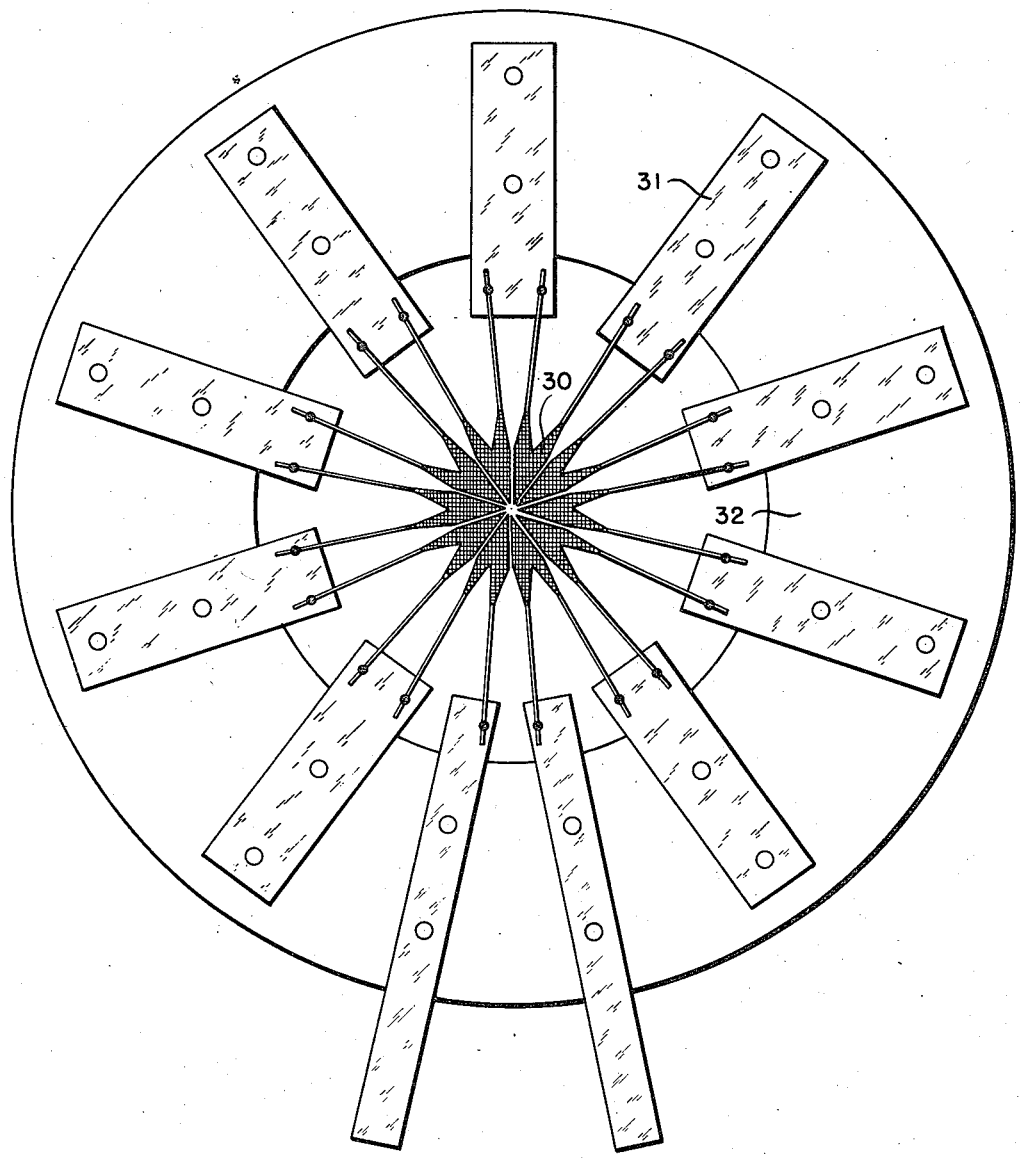
Fig. 8 is an enlarged view illustrating in detail the thermopile shown in Figs. 6 and 7.

In Fig. 8 a view of the thermopile 7 enlarged in relation to the other parts is shown. The thermopile 7 consists of ten V-shaped thermocouples 30 which are spot-welded to a terminal assembly consisting of eleven flat metal strips 31. The flat strips of metal 31 are spaced radially at regular intervals around an annular sheet of mica 32. The hot junctions of the thermocouples 30 are flattened and are spaced around the center of the mica disc 32 and form the radiation receiver of the thermopile 7. The flattened hot junctions of the thermocouples 30 are blackened on the side which is exposed to the lens 5 with aquadag and thereafter are smoked as, for example, by means of a match to provide a surface which will readily absorb substantially all of the incident radiation. The other side of the radiation receiver is not treated and therefore presents a more or less shiny surface. The cold junctions of the thermocouples 30 are located at the points of attachment thereof to the metal strips 31.

The flat strips 31 may desirably be composed of the metal known as constantan and are fastened to the mica sheet 32 by flattened over extrusions formed in the strips 31 and which extend through suitable openings provided in the mica sheet 32. This arrangement for constructing the thermopile 7 provides a thermopile consisting of a single unit which is both rugged and rigid and in addition which may be readily manufactured at relatively low cost.

The thermopile 7 is sandwiched between two other annular mica discs 33 and 34 and this arrangement is clamped between the front and rear parts 21 and 22 of the thermopile housing 6, the parts being drawn firmly into contact with each other over the large surface area outside of the thermopile 7. The parts 21 and 22 of the thermopile housing 6 are composed of material, having high thermal conductivity such as aluminum, made thick to insure temperature equality throughout their mass. The thin flat cold junction strips 31 have very low heat capacity and are exposed to the thermopile housing parts 21 and 22 over relatively large areas through the mica sheets 33 and 34. The mica sheets 33 and 34 are made thin in order to insure continuous temperature equality between the flat cold junction strips 31 and the thermopile housing 6. The chamber 35 within the thermopile housing 6 and in which the thermopile 7 is located is small enough to eliminate convection air currents and to minimize the time required for the contained air within the chamber 35 to assume a state of equilibrium with respect to the thermopile housing 6. As shown in Fig. 8 the thermocouple wires are made relatively short and are so chosen as to provide the desired conduction factor Q.

The use of relatively short thermocouple wires chosen to provide the proper conduction factor Q, and the absence of any extra metal disc for use as a radiation receiver in conjunction with a thermopile housing 6 constructed as described combine to insure that the hot junctions of the thermopile as well as the cold junctions thereof will respond completely to changes in the thermopile housing temperature with such rapidity that transient errors are made negligible while the body of the pyrometer including the housing 6 is undergoing a change of temperature.

Figure 9:
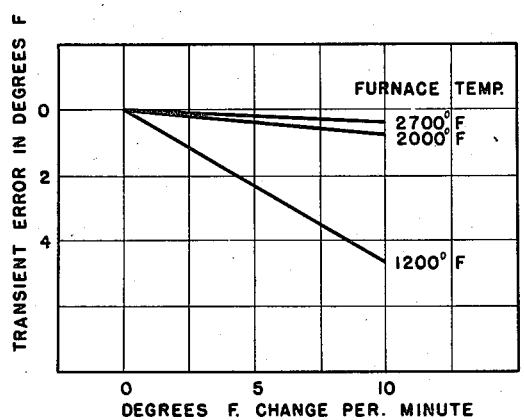
Figs. 9–12 show curves illustrating the operation of the radiation pyrometer shown in Figs. 6–8.

The curves shown in Fig. 9 are drawn from test data giving the transient errors in temperature measurement produced when the pyrometer body varies at the indicated rates in degrees Fahrenheit per minute. A change of 10° F. per minute is extreme but even at such a rate the temperature errors can be seen to be very small even at comparatively low values of furnace temperature.

Table III shows a list of observed values of excess temperature of the radiation receiver over the pyrometer temperature and a list of the corresponding values of Q applying to the pyrometer. These values were obtained from calibration data taken upon a pyrometer constructed as shown in Figs. 6–8. They apply when the shell temperature $T_3$ is 300° Kelvin (80° F.). In this case the value of the term $$\frac{\sin^2 \theta_2}{1+e}$$

is made 0.024 rather than 0.04 as chosen for the calculation of Tables I and II in order to provide greater flexibility of adjustment of the calibration. The series of values of Q given in the third column of Table III are seen to increase slightly with the increasing furnace temperature while the shell temperature remains constant. This may be accounted for in part by the temperature rise in parts of the thermopile and in the air surrounding the latter as indicated by the temperature coefficients of thermal conductivity contained in Equation (6). Failure to take into account the tendency for the effective value $\lambda$, representing the limiting wavelength of transmission of the lens, to shift slightly toward shorter wave lengths with increasing furnace temperature indicates the probability that the true extent of the increase of Q should be somewhat less than that shown in Table III.

TABLE III

[Values determined from calibration data with pyrometer constructed as shown in Figs. 6 to 8, applying when shell temperature $T_3$ is at 300° K. (80° F)]

| Furnace temperature $T_1$, °K. | Excess $\Delta T_a$ of hot jct. temp. over shell temp., deg. C. | Corresponding value for Q |
|---|---|---|
| 800 | 1.12 | $8.73 \times 10^{10}$ |
| 900 | 2.31 | $8.76 \times 10^{10}$ |
| 1,000 | 4.25 | $8.78 \times 10^{10}$ |
| 1,100 | 7.17 | $8.81 \times 10^{10}$ |
| 1,200 | 11.31 | $8.84 \times 10^{10}$ |
| 1,300 | 16.93 | $8.87 \times 10^{10}$ |
| 1,400 | 24.28 | $8.90 \times 10^{10}$ |
| 1,500 | 33.64 | $8.94 \times 10^{10}$ |
| 1,600 | 45.23 | $8.99 \times 10^{10}$ |
| 1,700 | 59.29 | $9.04 \times 10^{10}$ |
| 1,800 | 75.98 | $9.12 \times 10^{10}$ |
| 1,900 | 95.39 | $9.20 \times 10^{10}$ |
| 2,000 | 117.67 | $9.30 \times 10^{10}$ |

The close approach of these values for Q to the value $10 \times 10^{10}$ used in the lower section of Table II indicates that deductions based upon this section of Table II are applicable to the pyrometer to which Table III applies. Inspection of the values listed in column 7 of Table II shows that such a conduction factor is very favorable for good ambient temperature compensation.

Figure 10:
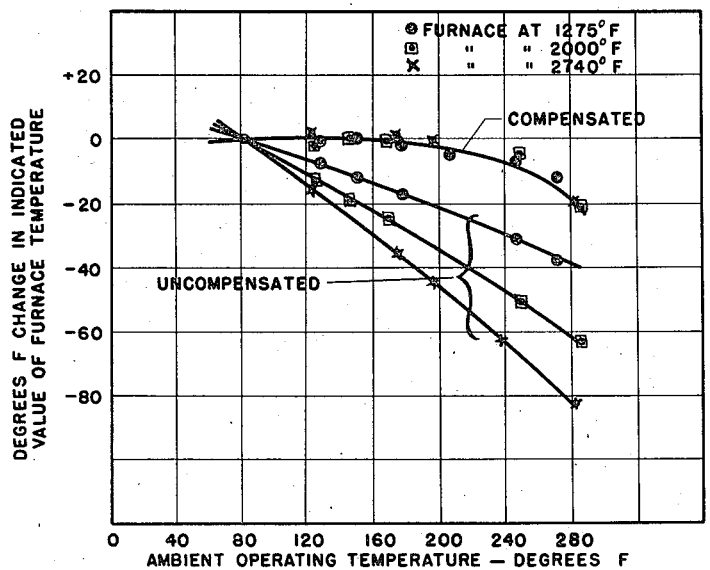

The degree to which these conclusions are borne out in practice is shown in Fig. 10. Fig. 10 illustrates curves showing ambient temperature coefficient tests taken on the pyrometer developed in accordance with the present invention both with and without the compensating shunt resistance 8 being connected. The three lower curves apply for the pyrometer when uncompensated. These curves show the errors in degrees Fahrenheit corresponding to furnace temperatures of 1275° F., 2000° F., and 2740° F. The single upper curve represents the corresponding errors when the nickel shunt resistance 8 is connected across the terminals of the thermopile. It will be noted that substantially complete compensation is obtained for a wide range of furnace temperatures when the pyrometer is subjected to a large variation in ambient temperature. If it is desired to raise the right-hand end of the upper curve while preserving zero error at 80° F. ambient operating temperature, this can be done by decreasing the resistance of the shunt 8. Points between 120° F. and 160° F. will then be thrown slightly above the line representing zero error.

Figure 11:
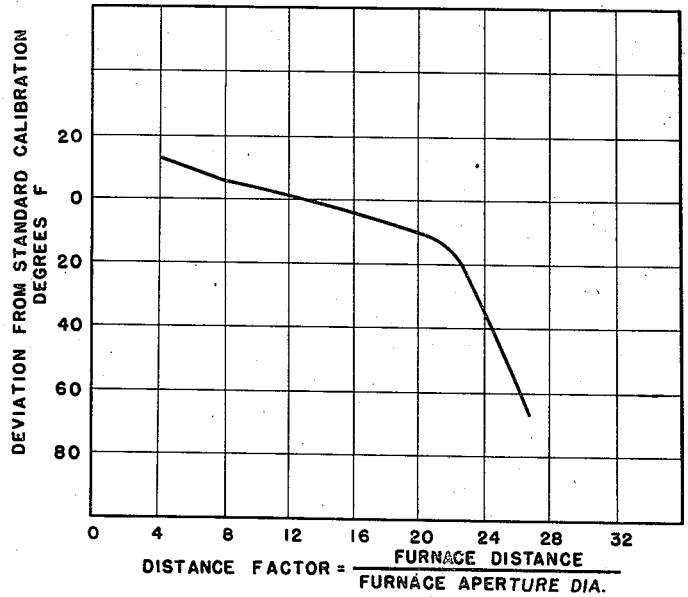

Fig. 11 shows the way in which the observed pyrometer indication varies with respect to variation of distance factor. Thus curve applies when the pyrometer is sighted upon the furnace aperture without any especial aids such as intervening baffles or diaphragms, and without making any readjustments in sensitivity or focus. The curve is a composite of three sets of data, and it holds reasonably closely for all furnace temperatures at which tests were made (1200° F. to 2750° F.). The appearance of this curve suggests somewhat large deviations of readings with respect to furnace ratio, but close examination will show that the deviations are rather small. It is noted suitable auxiliary diaphragms could be employed to eliminate the small variation illustrated in Fig. 11.

Figure 12:
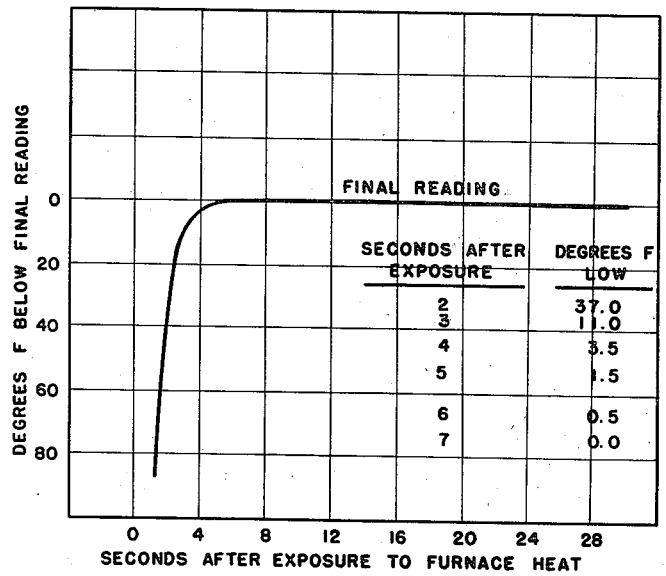

Fig. 12 gives the observed time for response. If the pyrometer is sighted upon a furnace aperture and then has its lens 5 covered for any chosen length of time, the response upon removal of the cover from the lens will be as shown. This curve is substantially exact for any furnace temperature from 1200° F. to 2700° F. The upper edge of the curve corresponds more closely to the rate when the furnace is at 1200° F. and the lower edge when the furnace is at 2700° F. The reading, in terms of furnace temperature, comes within 3.5° F. of a stable value in four seconds, within one-half of a degree or less in six seconds, and at the end of seven seconds the reading has reached a final value from which it does not depart as long as the furnace temperature remains constant. The table given in Fig. 12 lists other values showing the response characteristics of the pyrometer.

Fig. 13 is a view from the rear of the preferred form of a radiation pyrometer embodying the features of the present invention with the terminal compartment cover 12 removed. This view shows the terminals 10 and 11 and the rear of the thermopile housing 6.

Fig. 14 is a view from the front of the radiation pyrometer. The mounting flange 16 provided at the front adapts the instrument for use with any one of a group of accessories suited to various industrial applications. The mounting ring 17 shown in Fig. 6 and referred to hereinbefore is useful in conjunction with such mounting accessories.

While in accordance with the provisions of the statutes, I have illustrated and described preferred embodiments of the present invention, those skilled in the art will understand that changes may be made in the form of the apparatus disclosed without departing from the spirit of my invention as set forth in the appended claims, and that some features of the present invention may sometimes be used with advantage, without a corresponding use of other features.

Having now described my invention, what I claim as new and desire to secure by Letters Patent is:

1. In a radiation pyrometer including a thermopile having a radiation receiver and a plurality of cold junctions, heat absorbing structure in heat transfer relation with the cold junctions to prevent the latter from rising in temperature as a result of heat conducted thereto from the radiation receiver, and a temperature responsive impedance connected in circuit with said thermopile and arranged in heat transfer relation with said structure to be maintained at a temperature substantially equal to that of the cold junctions of the thermopile to compensate for variations in the ambient temperature to which the said cold junctions are subjected.

2. In a radiation pyrometer including a thermopile having a radiation receiver and a plurality of cold junctions, heat absorbing structure in close thermal contact with the cold junctions and comprising a mass of material having good thermal conduction characteristics to insure uniformity of temperature throughout said structure to maintain the temperature of the cold junctions substantially the same as that of said structure, irrespective of heat conducted thereto from the radiation receiver of said thermopile, and a temperature responsive impedance connected in circuit with said thermopile and arranged in heat transfer relation with said structure to be maintained at a temperature substantially equal to that of the cold junctions of said thermopile to compensate for variations in the ambient temperature to which said cold junctions are subjected.

3. In a radiation pyrometer including a thermopile having a radiation receiver and a plurality of cold junctions, heat absorbing structure in close thermal contact with the cold junctions and comprising a mass of material having good thermal conduction characteristics to insure uniformity of temperature throughout said structure and arranged to surround the radiation receiver and the cold junctions of said thermopile, and a temperature responsive impedance connected in circuit with said thermopile and arranged in close thermal contact with said structure to compensate for variations in ambient temperature to which said structure and thereby said cold junctions are subjected.

4. In a radiation pyrometer including a thermopile having a radiation receiver and a plurality of cold junctions, heat absorbing structure in close thermal contact with the cold junctions and comprising a mass of material having good thermal conduction characteristics to insure uniformity of temperature throughout said structure and arranged to surround the radiation receiver and the cold junctions of said thermopile, and a resistance having a temperature coefficient of resistance connected in shunt to said thermopile and arranged in close thermal contact with said structure to compensate for variations in ambient temperature to which said structure is subjected.

5. In a radiation pyrometer including a thermopile having a radiation receiver and a plurality of cold junctions, structure comprising a mass of material having good thermal conduction characteristics to insure uniformity of temperature throughout said structure, said structure surrounding the radiation receiver and the cold junctions of said thermopile and arranged in close thermal contact with said cold junctions, and a resistance having a temperature coefficient of resistance connected in shunt to said thermopile and arranged in close thermal contact with said structure to compensate for variations in ambient temperature to which said structure is subjected.

6. In a radiation pyrometer of the thermoelectric type, a thermopile comprising a plurality of thermocouple elements, each of said thermocouple elements having a hot junction and a cold junction, heat absorbing structure in close thermal contact with the cold junctions and to prevent the latter from rising in temperature as a result of heat conducted thereto from the hot junctions of said thermopile, and a resistance having a temperature coefficient of resistance connected in shunt to said thermopile and arranged to be maintained at a temperature substantially equal to that of the cold junctions.

7. In a radiation pyrometer including a thermoelectric element having a hot junction and a cold junction, heat absorbing structure in close thermal contact with the cold junction to prevent the latter from rising in temperature as a result of heat conducted thereto from the hot junction, and a temperature responsive impedance connected in circuit with said thermoelectric element and arranged in close thermal contact with said structure to be maintained at a temperature substantially equal to that of the cold junction.

8. In a radiation pyrometer including a thermoelectric element having a hot junction and a cold junction, structure comprising a mass of material having good thermal conduction characteristics to insure uniformity of temperature throughout said structure and arranged to surround the hot and cold junctions of said thermoelectric element, and a resistance having a temperature coefficient of resistance connected in shunt to said thermoelectric element and arranged to be maintained at a temperature substantially equal to that of said structure to compensate for variations in ambient temperature to which said structure and thereby said cold junctions are subjected.

9. In a radiation pyrometer including a thermoelectric element having a hot junction and a cold junction, structure comprising a mass of material having good thermal conduction characteristics to insure uniformity of temperature throughout said structure, said structure surrounding the hot and cold junctions of said thermoelectric element and arranged in good thermal contact with said cold junction, and a resistance having a temperature coefficient of resistance connected in shunt to the thermoelectric element and arranged in close thermal contact with said structure to compensate for variations in ambient temperature to which said structure is subjected.

10. A thermopile structure for detecting radiation including a plurality of thermoelectric elements the hot junctions of which are disposed near each other and comprise the radiation receiver and which are blackened on the side exposed to the radiation and the cold junctions of which are comprised of thin metal strips having a large surface relatively to their mass, and an annular ring of material having good thermal conduction characteristics but poor electrical conduction characteristics on which the said cold junctions are radially disposed, being rigidly secured thereto by means of flattening over extrusions formed in the metal strips and extending through openings in said ring, said annular ring being arranged with the circular perforation therein concentric with the radiation receiver of said thermopile.

11. The combination of claim 10 wherein the hot junctions of the thermoelectric elements comprise flattened welded junctions which are V-shaped and are radially disposed in a plane near each other.

12. A thermopile structure for detecting radiation including a plurality of elongated electrically conductive strips having small thermal capacity and a large surface relative to their mass, an annular ring of material having good thermal conduction characteristics but poor electrical conduction characteristics on which the said strips are radially disposed being rigidly secured thereto by flattening over extrusions formed in the metal strips and extending through holes in said ring, two adjacent ones of said strips comprising the terminals of said thermopile, a thermoelectric element individual to each one of said terminal strips and having one end welded thereto, and two thermoelectric elements individual to each one of the remaining strips and having one end welded thereto, all of said thermoelectric elements extending toward the center of said annular ring with pairs of the extended ends welded together to form hot junctions of the thermopile structure.

13. The combination of claim 12 wherein the welded junctions of said thermoelectric elements near the center of said annular ring are flattened and formed into a V-shape and the flattened junctions are arranged in a plane in close alignment with the ends of the junctions pointing toward the center of said annular ring, and wherein the side of said flattened junctions which is to be exposed to the radiation to be detected is blackened.

14. In a radiation pyrometer of the thermoelectric type, a thermopile comprising a plurality of thermocouple elements connected in series, each of said thermocouple elements having a hot junction and a cold junction, said cold junctions having small thermal capacity and having a large surface for conducting heat from them relatively to their mass, structure comprising a mass of material having good thermal conduction characteristics to insure uniformity of temperature throughout said structure and having a small chamber therein in which said hot junctions are disposed, a material having good thermal conduction characteristics but poor electrical conduction characteristics to directly thermally connect said cold junctions and said structure, and a resistance connected in circuit with said thermopile and having a temperature coefficient of resistance arranged in close thermal conducting relation with said structure to compensate for variations in ambient temperature to which said structure is subjected.

15. In a radiation pyrometer of the thermoelectric type, a thermopile comprising a plurality of thermocouple elements connected in series, each of said thermocouple elements having a hot junction and a cold junction, said cold junctions having small thermal capacity and having a large surface for conducting heat from them relatively to their mass, structure comprising a mass of material having good thermal conduction characteristics to insure uniformity of temperature throughout said structure, said structure having a small chamber in which said hot junctions are disposed, and a material having good thermal conduction characteristics but poor electrical conduction characteristics to directly thermally connect said cold junctions and said structure.

16. A radiation pyrometer for detecting radiation including a thermopile having a radiation receiver and a plurality of cold junctions, structure in close thermal contact with the cold junctions and comprising a mass of material having high thermal conduction characteristics to insure uniformity of temperature throughout said structure to maintain the temperature of the cold junctions of said thermopile substantially the same as that of said structure irrespective of heat conducted thereto from the radiation receiver of said thermopile, and an adjustable diaphragm in good thermal conductive relation with said structure and disposed between said thermopile and the radiation under detection to vary the irradiation of said radiation receiver as required to effect the desired calibration adjustment of said pyrometer.

17. A radiation pyrometer for detecting radiation including a thermopile having a radiation receiver and a plurality of cold junctions, structure in close thermal contact with the cold junctions and comprising a mass of material having high thermal conduction characteristics to insure uniformity of temperature throughout said structure to maintain the temperature of the cold junctions of said thermopile substantially the same as that of said structure irrespective of heat conducted thereto from the radiation receiver of said thermopile, an aperture provided in said structure to limit the irradiation of said radiation receiver, and an adjustable diaphragm in good thermal conductive relation with said structure and disposed between said thermopile and the radiation under detection to vary the irradiation of said radiation receiver as required to effect the desired calibration adjustment of said pyrometer.

said adjustable diaphragm having high thermal capacity and being so configured as to prevent reflections therefrom to said radiation receiver.

18. A radiation pyrometer for detecting radiation including a thermopile having a radiation receiver and a plurality of cold junctions, said cold junctions consisting of thin metal strips having a large surface relatively to their mass, a housing for said thermopile comprising a mass of material having high thermal conduction characteristics to insure uniformity of temperature throughout said structure and arranged in close physical contact and thermal relation with said cold junctions, said housing having a small chamber formed therein in which said radiation receiver is arranged out of direct physical contact therewith.

19. The combination of claim 18 wherein said thermopile has a conduction factor within the range of between slightly less than $3 \times 10^{10}$ and slightly greater than $10 \times 10^{10}$.

20. A radiation pyrometer for detecting radiation including a thermopile having a radiation receiver and a plurality of cold junctions, structure comprising a mass of material having good thermal conduction characteristics to insure uniformity of temperature throughout said structure, said structures having a small chamber in which said radiation receiver is disposed, and a material having good thermal conduction characteristics but poor electrical conduction characteristics to directly thermally connect said cold junctions and said structure.

21. The combination of claim 20 wherein the thermopile is comprised of a plurality of thermocouples the hot junctions of which are disposed near each other and comprise the radiation receiver and which are blackened on the side exposed to radiation.

22. The combination of claim 20 wherein the thermopile is comprised of a plurality of thermocouples the hot junctions of which are disposed near each other on a circle of one diameter and comprise the radiation receiver and which are blackened on the side exposed to radiation, wherein the cold junctions are comprised of thin metal strips are disposed on a circle concentric with said first mentioned circle but of larger diameter, and wherein said second mentioned material includes an annular ring to which the said cold junctions are rigidly secured by means of flattening over extrusions formed in the metal strips and extending through openings in the said ring.

23. A radiation pyrometer for detecting radiation including a thermopile having a radiation receiver and a plurality of cold junctions, a housing for said thermopile in close physical contact with the cold junctions and comprising a mass of material having high thermal conduction characteristics to insure uniformity of temperature throughout said housing to maintain the temperature of the cold junctions of said thermopile substantially the same as that of said housing irrespective of heat conducted thereto from the radiation receiver of said thermopile, said housing having a small chamber formed therein in which the radiation receiver is arranged out of direct physical contact with said housing, and binding posts connected to said thermopile and arranged in close thermal contact with said housing.

24. A radiation pyrometer for detecting radiation including a thermopile having a radiation receiver and a plurality of cold junctions, a housing for said thermopile comprising a mass of material having high thermal conduction characteristics to insure uniformity of temperature throughout said housing the cold junctions of said thermopile being positioned in close physical and thermal contact with said housing whereby the temperature of the cold junctions is maintained substantially the same as that of said housing irrespective of heat conducted thereto from the radiation receiver of said thermopile, said housing having a small chamber formed therein in which the radiation receiver is arranged out of direct physical contact with said housing and having an opening through which the radiation to be detected passes into said chamber to said radiation receiver, means to focus the radiation to be detected on said radiation receiver, and an adjustable diaphragm in good thermal conductive relation with said housing to vary the irradiation of said radiation receiver as required to effect the desired calibrating adjustments of said pyrometer.

25. A radiation pyrometer for detecting radiation including a thermopile having a radiation receiver and a plurality of cold junctions, a housing for said thermopile comprising a mass of material having high thermal conduction characteristics to insure uniformity of temperature throughout said housing the cold junctions of said thermopile being positioned in close physical and thermal contact with said housing whereby the temperature of the cold junctions is maintained substantially the same as that of said housing irrespective of heat conducted thereto from the radiation receiver of said thermopile, said housing having a small chamber formed therein in which the radiation receiver is arranged out of direct physical contact with said housing and having an opening through which the radiation to be detected passes into said chamber to said radiation receiver, binding posts connected to said thermopile and arranged in close thermal contact with said housing, means to focus the radiation to be detected on said radiation receiver, and an adjustable diaphragm in good thermal conductive relation with said housing to vary the irradiation of said radiation receiver as required to effect the desired calibrating adjustments of said pyrometer.

26. A radiation pyrometer for detecting radiation including a thermopile having a radiation receiver and a plurality of cold junctions, a first housing for said thermopile comprising a mass of material having high thermal conduction characteristics to insure uniformity of temperature throughout said housing, the cold junctions of said thermopile being positioned in close thermal contact with said housing whereby the temperature of the cold junctions is maintained substantially the same as that of said housing irrespective of heat conducted thereto from the radiation receiver of said thermopile, said first housing having a small chamber formed therein in which the radiation receiver is arranged out of direct physical contact with said housing and having an opening through which the radiation to be detected passes into said chamber to said radiation receiver, a resistance connected in circuit with said thermopile and having a temperature coefficient of resistance in close thermal conducting relation with said inner housing to compensate for variations in ambient temperature to which said structure is subjected, a lens, a second housing for said thermopile in which said lens is mounted to focus the radiation to be detected upon said radiation receiver and in which a binding post compartment is provided, said second housing having high thermal conduction characteristics and surrounding said first housing being in good thermal contact therewith to insure equality of temperature between said lens and said thermopile, an adjustable diaphragm in good thermal conductive relation with said housings to vary the irradiation of said radiation receiver as required to effect the desired calibration adjustment of said pyrometer, binding posts connected to said thermopile and disposed in said binding post compartment in good thermal conductive relation with said first housing, and means for attaching a conduit to said second housing.

27. A radiation pyrometer of the thermoelectric type for detecting radiation including a thermopile comprising a plurality of thermocouple elements connected in series, each of said thermocouple elements having a hot junction and a cold junction, said cold junctions consisting of metal strips of high thermal conductivity having a large surface relatively to their mass, a first housing for said thermopile comprising a mass of material having high thermal conduction characteristics to insure uniformity of temperature throughout said housing and having a small chamber therein in which said hot junctions are disposed, a material having good thermal conduction characteristics but poor electrical conduction characteristics arranged to thermally connect said cold junctions and said housing, a resistance having a temperature coefficient of resistance connected in shunt with said thermopile and arranged in close thermal conducting relation with said housing to compensate for variations in ambient temperature to which said cold junctions are subjected, said housing having an opening through which the radiation to be detected passes into said chamber to the hot junctions of said thermopile, a lens, a second housing for said thermopile in which said lens is mounted to focus the radiation to be detected upon the hot junctions of said thermopile and in which a binding post compartment having a removable cover is provided, binding posts connected to said thermopile and disposed in said binding post compartment in good thermal conducting relation with said first housing, said second housing having high thermal conduction characteristics and surrounding said first housing and being in good thermal contact therewith to insure equality of temperature between said lens and said thermopile, an adjustable diaphragm in good thermal conductive relation with said first housing and disposed between said thermopile and the radiation under detection to vary the irradiation of said hot junctions as required to effect the desired calibration adjustments of said pyrometer and having a part thereof extending into the binding post compartment whereby said adjustable diaphragm is accessible for adjustment through said binding post compartment, and means for attaching a conduit to said second housing.

28. The combination of claim 27 wherein said thermopile has a conduction factor within the range of slightly less than $3 \times 10^{10}$ and slightly greater than $10 \times 10^{10}$.

29. In a radiation pyrometer, a thermopile having a radiation receiver and output terminals, binding posts to which said output terminals are connected, a housing for said thermopile provided with a compartment in which said binding posts are disposed and means for focussing radiation from the source under measurement on said radiation receiver, a removable cover for said binding post compartment, and a window provided in said cover for facilitating sighting of said pyrometer upon the source of radiation.

30. In a radiation pyrometer, a thermopile having a radiation receiver and output terminals, binding posts to which said output terminals are connected, a housing for said thermopile provided with a compartment in which said binding posts are disposed and means for focussing radiation from the source under measurement on said radiation receiver, a removable cover for said binding post compartment, and a lens provided in said cover for facilitating sighting of said pyrometer upon the source of radiation.

31. In combination, an elongated cylindrical radiation pyrometer housing having a compartment at one end, a thermopile having a radiation receiver and output terminals disposed within but intermediate the ends of said pyrometer housing, binding posts to which said output terminals are connected disposed in said compartment, means at the other end of said pyrometer housing for focussing radiation from the source under measurement on said radiation receiver, a removable cover for said binding post compartment, and a window provided in said cover for facilitating sighting of said pyrometer upon the source of radiation.

32. In combination, an elongated cylindrical radiation pyrometer housing having a compartment at one end, a thermopile having a radiation receiver and output terminals disposed within but intermediate the ends of said pyrometer housing, binding posts to which said output terminals are connected disposed in said compartment, means at the other end of said pyrometer housing for focussing radiation from the source under measurement on said radiation receiver, a removable cover for said binding post compartment, and a magnifying lens provided in said cover for facilitating sighting of said pyrometer upon the source of radiation.

33. In a radiation pyrometer, a thermopile having a radiation receiver, cold junctions and output terminals, a resistor having a temperature coefficient of resistance connected in shunt to said thermopile output terminals, structure having high thermal conductivity and capacity surrounding said thermopile and said resistor, said resistor and the cold junctions of said thermopile being in close thermal contact with said structure to insure substantial temperature equalization between said components, said thermopile having the characteristic that without the shunt resistor the electromotive force developed by the thermopile will be changed in substantially a constant ratio for all temperatures of the radiation source under measurement within the range of measurement of the pyrometer and the resistance of said resistor having such a relation with respect to the resistance of the thermopile that the potential difference between the output terminals of said thermopile remains substantially constant when the ambient temperature to which the pyrometer is subjected is varied for a predetermined temperature of the radiation source.

34. In a radiation pyrometer including a thermopile having a radiation receiver and a plurality of cold junctions and the output electromotive force of which tends to change significantly with variation in the ambient temperature to which the cold junctions are subjected, heat absorbing structure in close physical contact with the cold junctions to prevent the latter from rising in temperature as a result of heat conducted thereto from the radiation receiver, and a temperature responsive impedance connected in circuit with said thermopile and arranged in close physical contact with said structure to be maintained at a temperature substantially equal to that of the cold junctions of the thermopile to compensate for variations in the ambient temperature to which the said cold junctions are subjected.

35. In a radiation pyrometer, a radiation pyrometer body, a thermopile disposed within said radiation pyrometer body and having a high conduction factor, said thermopile having a radiation receiving surface which is symmetrical about a predetermined axis, and a resistance having a temperature coefficient of resistance connected in circuit with said thermopile and arranged within said pyrometer body in close physical contact with said thermopile and radiation pyrometer body to compensate for variations in the ambient temperature to which said thermopile is subjected, said resistance comprising a coil so arranged with respect to said thermopile and radiation pyrometer body as to have said predetermined axis as its center.

36. In a radiation pyrometer, a radiation pyrometer body, a thermopile disposed within said radiation pyrometer body and having a high conduction factor, said thermopile having a radiation receiving surface which is symmetrical about a predetermined axis, and a nickel resistance having a temperature coefficient of resistance connected in shunt with said thermopile and arranged within said pyrometer body in close physical contact with said thermopile and radiation pyrometer body to compensate for variations in the ambient temperature to which said thermopile is subjected, said nickel resistance comprising a coil so arranged with respect to said thermopile and radiation pyrometer body as to have said predetermined axis as its center.

37. In a radiation pyrometer, a radiation pyrometer body, a thermocouple disposed within said radiation pyrometer body and having a high conduction factor, said thermocouple having a radiation receiving surface which is symmetrical about a predetermined axis, and a resistance having a temperature coefficient of resistance connected in circuit with said thermocouple and arranged within said pyrometer body in close physical contact with said thermocouple and radiation pyrometer body to compensate for variations in the ambient temperature to which said thermocouple is subjected, said resistance comprising a coil so arranged with respect to said thermocouple and radiation pyrometer body as to have said predetermined axis as its center.

38. In a radiation pyrometer, a radiation pyrometer, a thermopile disposed within said radiation pyrometer body and having a high conduction factor within the range of slightly less than $3 \times 10^{10}$ and slightly greater than $10 \times 10^{10}$, said thermopile having a radiation receiving surface which is symmetrical about a predetermined axis, and a resistance having a temperature coefficient of resistance connected in shunt with said thermopile and arranged within said pyrometer body in close physical contact with said thermopile and radiation pyrometer body to compensate for variations in the ambient temperature to which said thermopile is subjected, said resistance comprising a coil so arranged with respect to said thermopile and radiation pyrometer body as to have said predetermined axis as its center.

39. In a radiation pyrometer, a radiation pyrometer body, a thermopile disposed within said radiation pyrometer body and comprising a plurality of thermocouples having conduction losses from the hot junctions of a comparatively high value in relation to the conduction losses involved in the highest sensitivity thermopiles constructed in vacuum, said thermopile having a radiation receiving surface which is symmetrical about a predetermined axis, and a resistance having a temperature coefficient of resistance connected in shunt with said thermopile and arranged within said pyrometer body in close physical contact with said thermopile and radiation pyrometer body to compensate for variations in the ambient temperature to which said thermopile is subjected, said resistance comprising a coil so arranged with respect to said thermopile and radiation pyrometer body as to have said predetermined axis as its center.

40. In a radiation pyrometer, a radiation pyrometer body, a thermopile disposed within said radiation pyrometer body and having output terminals, said thermopile having a radiation receiving surface which is symmetrical about a predetermined axis, and a resistor having a temperature coefficient of resistance connected in shunt to said thermopile output terminals and arranged within said pyrometer body in close physical contact with said thermopile and radiation pyrometer body, said resistor comprising a coil so arranged with respect to said thermopile and radiation pyrometer body as to have said predetermined axis as its center, and said thermopile having the characteristic that without the shunt resistance the electromotive force developed by the thermopile will be changed in substantially a constant ratio for all temperatures of the radiation source under measurement within the range of measurement of the pyrometer.

41. The combination of claim 40 wherein the resistance of the resistor has such a relation with respect to the resistance of the thermopile that the potential difference between the output terminals of said thermopile remains substantially constant when the ambient temperature to which the pyrometer is subjected is varied irrespective of the temperature of the radiation source within the range of measurement.

42. In a radiation pyrometer, a radiation pyrometer body, a thermopile having hot and cold junctions disposed within said radiation pyrometer body whereby said junctions are both subjected to the same ambient temperature and having a high conduction factor, said thermopile having a radiation receiving surface which is symmetrical about a predetermined axis, and a resistance having a temperature coefficient of resistance connected in shunt with said thermopile and arranged within said pyrometer body in close physical contact with the hot and cold junctions of said thermopile and said radiation pyrometer body to compensate for differences between the temperature change of the hot junctions and the temperature change of the cold junctions caused by a change in ambient temperature when the temperature of the hot junctions is higher than the temperature of the cold junctions due to incident radiation, said resistance comprising a coil so arranged with respect to said thermopile and radiation pyrometer body as to have said predetermined axis as its center.

43. In a radiation sensitive instrument including an electrical effect producing radiation sensitive device having a radiation receiver part subjected to radiation to be detected and having a part subjected to ambient temperature conditions and the output electrical effect of which tends to change significantly with variation in the ambient temperature to which the second mentioned part of said radiation sensitive device is subjected, heat absorbing structure in close physical contact with the said second mentioned part to prevent the latter from rising in temperature as a result of heat conducted thereto from the radiation receiver part, and a temperature responsive impedance connected in circuit with said radiation sensitive device and arranged in close physical contact with said structure to be maintained at a temperature substantially equal to that of the said second mentioned part to vary the output electrical effect of the radiation sensitive device as required to compensate for variations in the ambient temperature to which the said second mentioned part is subjected.

THOMAS R. HARRISON.